United States Patent [19]

Turczyn

[11] Patent Number: 4,545,236

[45] Date of Patent: Oct. 8, 1985

[54] DEVICE FOR SIMULATING STRESS ON PACKAGES DURING COUPLING OF RAILCARS

[75] Inventor: Mark T. Turczyn, Cheverly, Md.

[73] Assignee: The United States of America as represented by the Secretary of Agriculture, Washington, D.C.

[21] Appl. No.: 620,815

[22] Filed: Jun. 15, 1984

[51] Int. Cl.$^4$ .............................................. G01M 7/00
[52] U.S. Cl. .................................... 73/12; 73/432 R; 188/377
[58] Field of Search ............... 73/12, 432 K; 188/376, 188/377

[56] References Cited

U.S. PATENT DOCUMENTS

| 2,740,286 | 3/1956 | De Vost | 73/12 |
| 3,428,150 | 2/1969 | Muspratt | 188/377 |
| 3,552,525 | 1/1971 | Schudel | 73/12 |

Primary Examiner—S. Clement Swisher
Attorney, Agent, or Firm—M. Howard Silverstein; David G. McConnell

[57] ABSTRACT

A device for simulating railcar shock during coupling of freight cars comprising an inclined ramp, a backboard at the bottom of the ramp, a dolly to roll down the ramp into the backboard, a disposable hollow cylinder to be temporarily attached to the backboard or the dolly to be crushed therebetween when the dolly rolls into the backboard.

9 Claims, 9 Drawing Figures

4,545,236

DEVICE FOR SIMULATING STRESS ON PACKAGES DURING COUPLING OF RAILCARS

FIELD OF THE INVENTION

This invention relates to devices for simulating railcar shock during coupling of freight cars in order to study the effect of such stress on different kinds of packages in the cars.

DESCRIPTION OF PRIOR ART

For many years an inclined ramp has been employed to simulate railcar shock imparted to packages. In such a device packages are loaded onto a rolling dolly which is pulled up the ramp or inclined plane by a chain and sprocket device. At the top of the ramp, the dolly is released from the chain, and thereafter rolls down the ramp into a fixed backboard usually covered with a thick piece of rubber.

This comparatively simple apparatus is a substantially accurate simulation of the shock experienced by packages during coupling of non-hydraulically cushioned train couplers which were in mode 40-50 years ago. However, with the advent of shock absorber-type mechanisms in train couplers (i. e., cushioned draft gears) to hydraulically cushion coupling action, the package testing industry has been unable to develop a simple and inexpensive mechanism to simulate same.

Heretofore there have been unsuccessful attempts to cover the fixed backboard with special kinds of foam rubber or liquid-filled, non-coil springs which allegedly would be able to simulate hydraulically cushioned coupling action. In addition, an elaborate and expensive device has been developed which employs a horizontal rather than inclined plane, a backboard having nitrogen-filled cylinders connected thereto, sling-shot type heavy bands to impel a horizontally-rolling dolly into the backboard, and a sophisticated braking system to stop the dolly after it impacts and rebounds.

SUMMARY OF INVENTION

The present invention provides a simple modification to the standard inclined plane testing unit which accurately simulates hydraulically cushioned coupling action experienced by packages during coupling of modern freight cars. Generally the device comprises a first fixed transverse wall or backboard at the lower end of the ramp in the manner of the prior art; a package holding means part of which, or the whole of which, is a dolly of the type employed in the prior art to roll down the ramp; a disposable, rigid, hollow cylinder open at at least one end, and being longitudinally crushable in an accordion-like manner; means to temporarily attach the cylinder to a surface of the backboard or to an opposing surface of the package holding means to extend therebetween so that the cylinder is crushed in an accordion-like manner therebetween when the package holding means rolls down the ramp into the backboard; wherein said surface of the backboard, or the opposing surface of the package holding means, includes orifice means aligned with an open end of the cylinder to provide for egress of air from the cylinder when the cylinder is crushed.

It is therefore an object of the present invention to provide a disposable cylinder which when crushed simulates the trapezoidally-shaped shock wave experienced by packages during coupling of hydraulically cushioned couplers on freight cars.

Another object is to provide a simple and inexpensive modification to existing test equipment which nonetheless simulates hydraulically cushioned coupling.

Other objects and advantages will be obvious from the following more detailed description of the invention.

DETAILED DESCRIPTION

Figure 1:
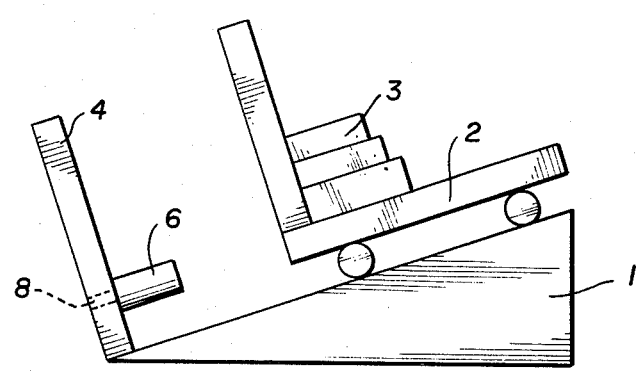
FIG. 1 shows the invention in its simplest form.

Referring to FIG. 1, reference numeral 1 designates a standard inclined plane or ramp system which has been used for testing Purposes in this art for the past 40-50 years, except with regard to certain elements discussed below.

Rolling dolly 2, having packages 3 thereon, is shown in position to roll down the ramp into fixed transverse wall or backboard 4. The chain drive and release mechanism for moving the dolly up the ramp, and for releasing it for sliding down the ramp are not shown because these details are well known in the art.

Figure 1A:
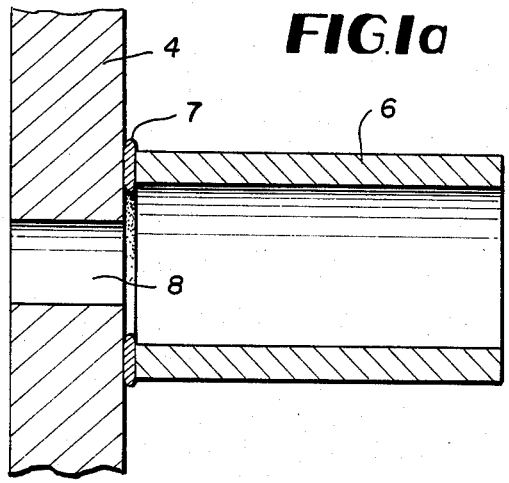
FIG. 1a shows the disposable cylinder temporarily attached to one of the walls of the system.

A disposable hollow cylinder 6 (shown in section in FIG. 1a), which is open at one or both ends, is temporarily attached to wall 4 by means of, for example, glue-caulk 7. As used herein, "temporarily" means that the cylinder-attaching means easily and rapidly connects each disposable cylinder to the wall, and, at the end of a test, the crushed cylinder is easily and rapidly detached from the wall and discarded.

When dolly 2 rolls down the ramp into the backboard, cylinder 6 is crushed therebetween. A hole 8 is provided in wall 4 to allow for egress of air from the cylinder during crushing.

Figure 1B:
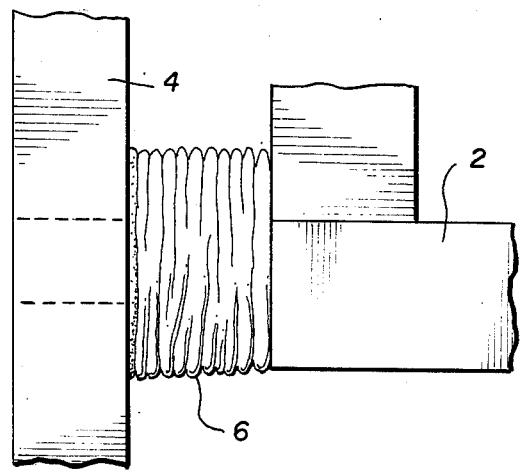
FIG. 1b is a crushed cylinder.

Cylinder 6 must be longitudinally crushable in an accordion-like manner as shown in FIG. 1b. The dimensions and materials of construction of the cylinder may be determined through routine experimentation. For example, an accelerometer may be attached to dolly 2 to measure the shock going through the dolly during impact; and various types of cylinders may be tested to determine which cylinder will yield the desired shock pattern.

It is known in the art that typical hydraulically cushioned railcars generate a long duration wave form, generally trapezoidal in shape, typically 1 g (force of gravity) in amplitude and 300 milliseconds in duration for an 8 kph coupling impact. Through experimentation it has been determined that a fiberboard hollow cylinder open at both ends, 46 cm in length, 8 cm outside diameter, and having a 0.6 cm wall thickness consistently generates this waveform. However, different materials of cylinder construction such as metal (e.g., aluminum) or plastic, different impact test speeds, and different momentums will require different cylinder dimensions.

Although shown attached to backboard or wall 4, cylinder 6 may be temporarily attached either to wall 4 or the opposing surface of the dolly. The air escape orifice means, although shown in wall 4 of FIG. 1a, also may be incorporated into the opposing dolly surface, as long as it is aligned with an open end of the cylinder. In addition, a plurality of cylinders may be employed at once, rather than one at a time, in order to simulate special conditions.

Other temporary fastening devices, in addition to glue-caulk, are suitable. For example, a ring-shaped groove may be machined into the wall to which the cylinder is to be attached. The diameter of the ring should be approximately the same as the diameter of the cylinder, but the groove should be slightly narrower than the thickness of the cylinder wall so that the cylinder may be snuggly inserted into the groove.

Figure 2:
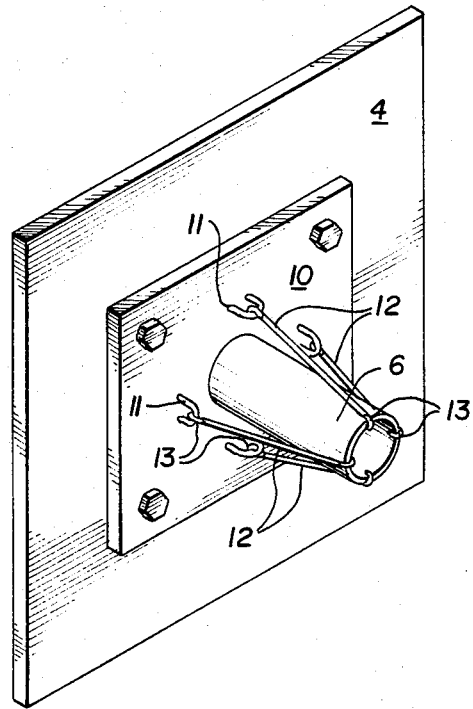
FIG. 2 is a preferred way to attach the cylinder to one of the walls.

A preferred attaching means is shown in FIG. 2. Referring thereto, numeral 10 designates a base plate secured to wall 4. A plurality of half loops or other types of hook-attaching means 11 are welded or otherwise secured to the plate 10. A spring or rubber band 12 having hooks 13 at each of its ends is hooked at one end to loop 12 and at the other end to the cylinder wall at its extremity, thereby retaining the cylinder in position under tension. Four such loops and accompanying bands are illustrated in the Figure adjacent and around the cylinder.

Figure 3:
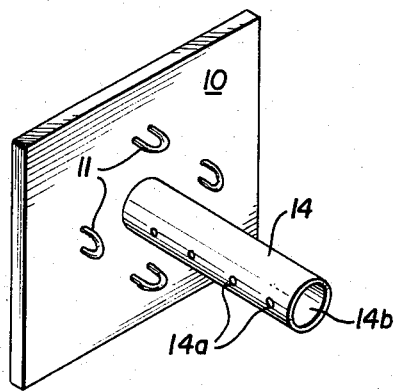
FIGS. 3, 3a and 3b illustrate a preferred modification of FIG. 2.
Figure 3A:
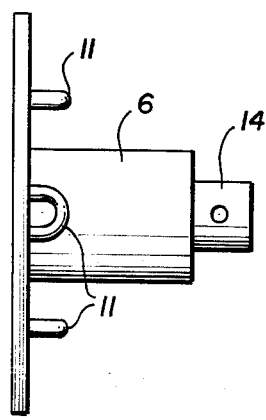
Figure 3B:
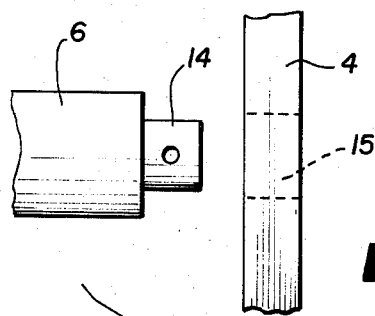

Referring to FIG. 3, therein is shown a preferred modification to FIG. 2 in which a hollow tube 14 is welded or otherwise secured to base plate 10. Tube 14, which acts as a positioning guide for the cylinder, is a few inches longer than the cylinder as can be seen in FIG. 3a. In order to accomodate the tube during crushing of the cylinder, a hole 15 somewhat larger than the tube is provide in the opposite wall, as shown in FIG. 3b, so that the tube passes through hole 15 during crushing. By means of orifices 14a and end-opening 14b on tube 14, a cylinder air escape path is provided by the tube during crushing of the cylinder.

It can be seen that hole 15 provides a dual function, i.e., orifice means for egress of air, and an opening which is large enough for movement of tube 14.

It is preferred that base plate 10 and tube 14 of FIG. 3 be connected to the dolly while hole 15 be provided in the backboard. In this manner, the cylinder more consistently will strike the opposite surface, during crushing, in a true perpendicular fashion.

Another preferred modification is to construct the cylinder-impact wall of wood, and to partially cover the wood with a metal plate at the point of impact, to absorb the force of the cylinder during each test; and thus hole 15 for tube 14 must pass through both the wood and metal pieces.

Figure 4:
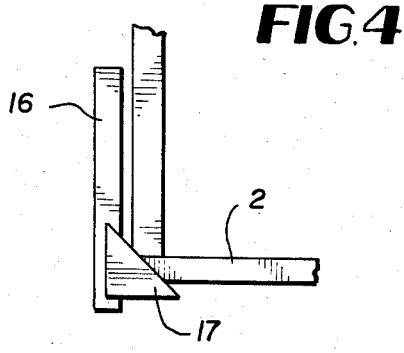
FIG. 4 illustrates a preferred way of connecting a transverse wall to the dolly.
Figure 4A:
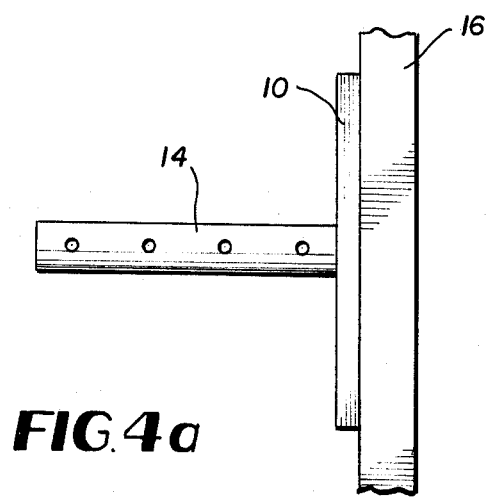
FIG. 4a is a modification of FIG. 4.

It is also preferable that the dolly not directly contact, or be directly connected to the cylinder because, in actual railcars, the carriage which directly receives the coupling jolt is not an integral part of the car housing which holds the packages. Thus, it is preferred, as shown in FIG. 4, that a second transverse wall 16 be connected by frame 17 to the dolly 2 (e.g., by welding) on the side of the dolly opposite the first transverse wall or backboard 4, to more closely approximate railcar action. In this modification, the package holding means thereby comprises dolly 2, wall 16 and frame 17; guide tube 14 preferably is connected to wall 16, as shown in FIG. 4a; and the cylinder is crushed between opposing surfaces of walls 4 and 16.

I claim:

1. An apparatus for simulating railcar coupling shock comprising
   a. an inclined ramp;
   b. a first transverse wall connected to the lower end of said ramp;
   c. package holding means on said ramp for rolling down said ramp into said wall; wherein said wall and package holding means have opposing surfaces;
   d. a rigid, hollow cylinder which is longitudinally crushable in an accordion-like manner, said cylinder having at least one open end;
   e. means to temporarily attach said cylinder to one of said opposing surfaces to extend outward therefrom in the direction of the other of said opposing surfaces so that said cylinder is crushed therebetween when said package holding means rolls down said ramp into said wall; and wherein one of said opposing surfaces includes orifice means aligned with an open end of said cylinder to provide for egress of air from said cylinder when said cylinder is crushed.

2. The apparatus of claim 1 wherein said cylinder is attached to said surface of said package holding means.

3. The apparatus of claim 2 further comprising a cylinder guide tube connected to said surface of said package holding means and extending in the direction of said wall, and wherein said cylinder slips over said tube when attached to said surface of said package holding means.

4. The apparatus of claim 3 wherein said orifice means is included in said wall surface and is large enough to provide a hole through which said guide tube extends when said cylinder is crushed between said surfaces.

5. The apparatus of claim 4 wherein said tube is hollow and open at one end, and includes orifice means in the tube wall to provide for egress of air from said cylinder when said cylinder is crushed between said surfaces.

6. The apparatus of claim 5 wherein said package holding means comprises a dolly, a frame connected to said dolly on the side of said dolly opposite said first transverse wall, and a second transverse wall connected to said frame opposite said first transverse wall, wherein said cylinder is attached to said second transverse wall and is crushed between said walls when said package holding means rolls down said ramp into said first transverse wall.

7. The apparatus any of of claims 1, 2, 5 or 6 wherein said cylinder is a hollow fiberboard cylinder open at both ends.

8. The apparatus any of of claims 2-6 wherein said cylinder attaching means comprises hook-attaching means connected to said package holding means adjacent said cylinder, and means to hook the outer extremity of said cylinder under tension to said hook-attaching means.

9. The apparatus of claim 8 wherein said cylinder is a hollow fiberboard cylinder open at both ends.

* * * * *